United States Patent [19]

Dieterlen

[11] Patent Number: 4,754,471
[45] Date of Patent: Jun. 28, 1988

[54] GATE ASSEMBLY FOR THE OPENING OF AN X-RAY APPARATUS FOR RECEIVING AN X-RAY CASSETTE

[75] Inventor: Paul E. Dieterlen, Kenton, Ky.

[73] Assignee: Liebel-Flarsheim Company, Cincinatti, Ohio

[21] Appl. No.: 44,725

[22] Filed: May 1, 1987

[51] Int. Cl.⁴ ............................................. G03B 42/02
[52] U.S. Cl. .................................... 378/167; 378/172; 369/77.1
[58] Field of Search ............... 378/177, 167, 172, 187; 414/182, 292, 403, 414; 369/77.1, 77.2; 354/277, 287

[56] References Cited

U.S. PATENT DOCUMENTS

| | | | |
|---|---|---|---|
| 4,454,599 | 6/1984 | Tsuchiya | 369/77.2 |
| 4,482,233 | 11/1984 | Bauer et al. | 378/182 |
| 4,512,704 | 4/1985 | Hösel | 414/292 |
| 4,675,858 | 6/1987 | d'Alayer de Costemore d'Arc | 369/77.1 |

Primary Examiner—Janice A. Howell
Assistant Examiner—David P. Porta
Attorney, Agent, or Firm—Marjama & Pincelli

[57] ABSTRACT

A gate assembly comprising a pair of leaves positioned behind the opening of a housing. After an x-ray cassette is placed through the gate assembly, the leaves rotate to prevent entering of any additional x-ray cassettes or foreign objects.

10 Claims, 4 Drawing Sheets

GATE ASSEMBLY FOR THE OPENING OF AN X-RAY APPARATUS FOR RECEIVING AN X-RAY CASSETTE

BACKGROUND OF THE INVENTION

X-ray cassettes come in a variety of sizes and are used for taking x-ray pictures. Typically these x-ray cassettes are placed through an opening in an x-ray apparatus specifically designed for receiving the x-ray cassette. Because of the large number of different sizes available the opening must be large enough to accommodate the variety of sizes of x-ray cassettes that may be placed therethrough. It is important in an apparatus of this type to prevent other x-ray cassettes from being placed therein when a cassette is already present and also to prevent foreign objects from entering the apparatus. This is particularly important in tomographic apparatus or taking tomographic x-rays as there are various moving mechanisms within the housing.

The present invention provides a gate assembly which minimizes or prevents the possibility of a second x-ray cassette or foreign object being placed within the apparatus when an x-ray cassette has already been placed in position.

SUMMARY OF THE INVENTION

This invention relates to a gate assembly within the opening of an apparatus for receiving an x-ray cassette having means for minimizing the entrance of a second x-ray cassette or other object into the receiving area. The gate assembly has first and second leaves mounted to a common pin. The gate assembly is provided with means for automatically closing the gate when a film cassette is placed within the apparatus.

DETAILED DESCRIPTION OF THE DRAWINGS

DETAILED DESCRIPTION OF THE INVENTION

Figure 1:
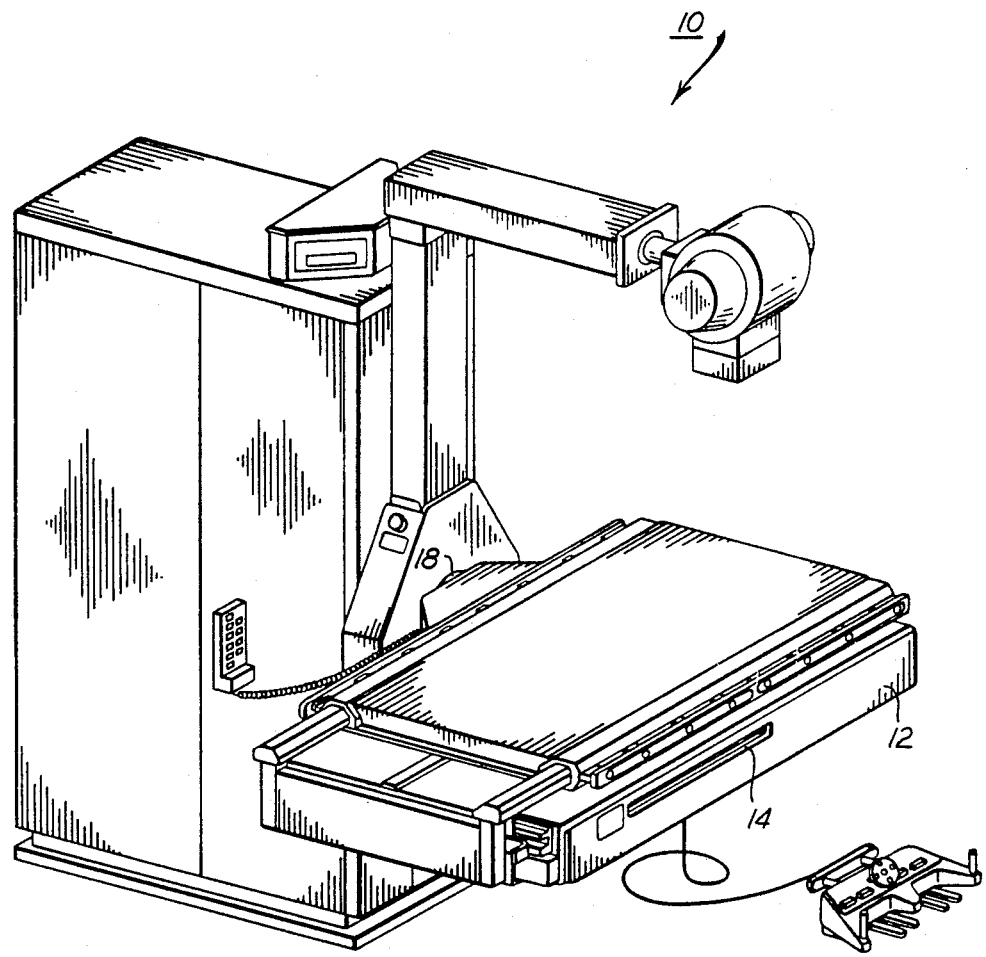
FIG. 1 is a perspective view of an apparatus having a gate assembly made in accordance with the present invention.
Figure 2:
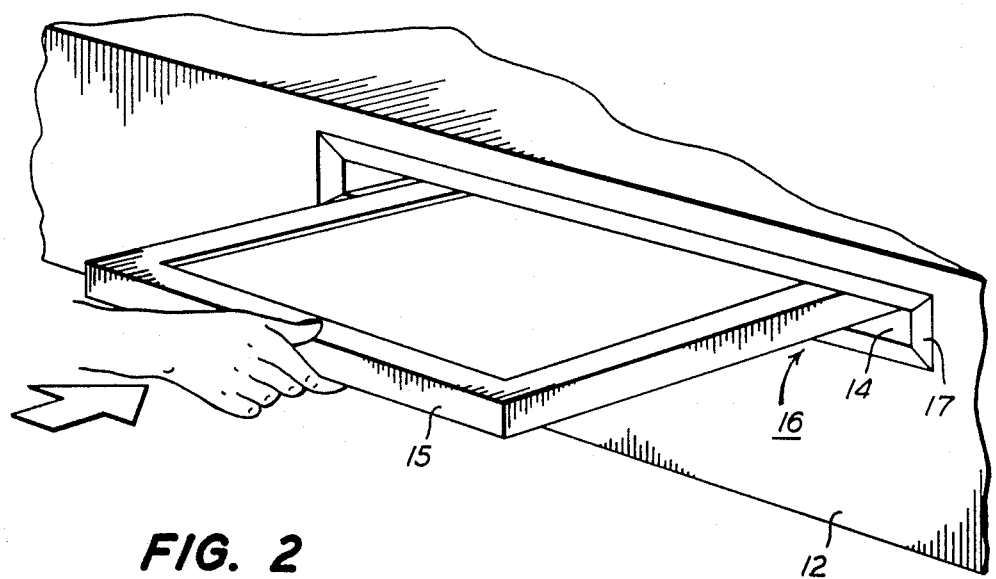
FIG. 2 is an enlarged fragmentary view of the opening of the gate assembly of the present invention.

Referring to FIGS. 1 and 2 there is illustrated an x-ray apparatus 10 having a filmer housing 12 for receiving x-ray cassettes. The filmer housing 12 is provided with an opening 14 whereby an x-ray cassette 15 may be passed therethrough to the filmer mechanism placed therein. The particular mechanism used to receive the cassette may be of any conventional design desired. Filed simultaneously herewith is a co-pending application, Ser. No. 045,877 which illustrates a new automatic filmer that may be disposed within housing 12, and hereby is incorporated by reference. Disposed at the opening 14 is a gate assembly 16.

Figure 3:
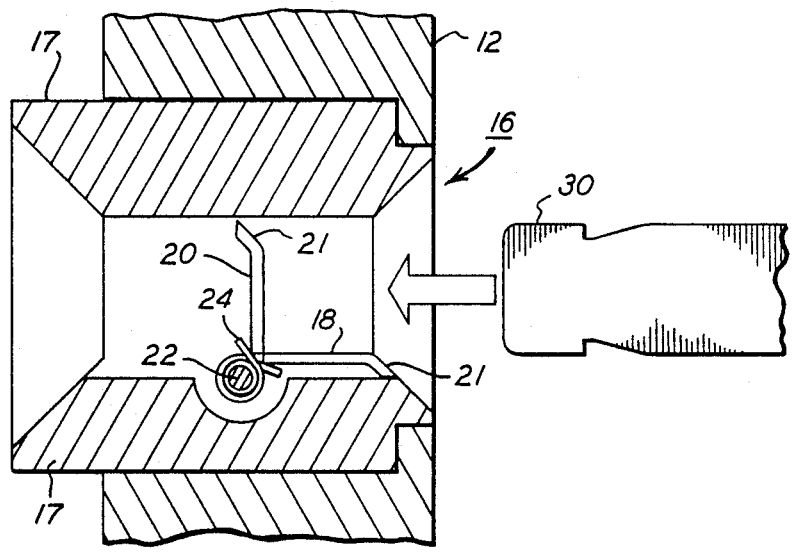
FIG. 3 is a side cross-sectional view of the gate assembly disposed at the opening of the housing for receiving a cassette.

Referring to FIG. 3 there is illustrated in cross-section gate assembly 16 having receiving block 17 secured to housing 12. The gate assembly is provided with a first leaf 18 and a second leaf 20 mounted on a common pin 22 which is secured at its ends to receiving block 17. The leaves 18, 20 are capable of being rotated about the pin 22. At least one torsion spring 24 is provided to keep the leaves 18, 20 at approximately 90° to each other when no other outside forces are acting on the leaves 18, 20. Ends 21 of the leaves 18, 20 are angled to allow easy passage of the cassettes. Leaves 18, 20 are preferably made of a rigid material having preferably a smooth surface to allow cassette 30 to easily side thereover.

Figure 4:
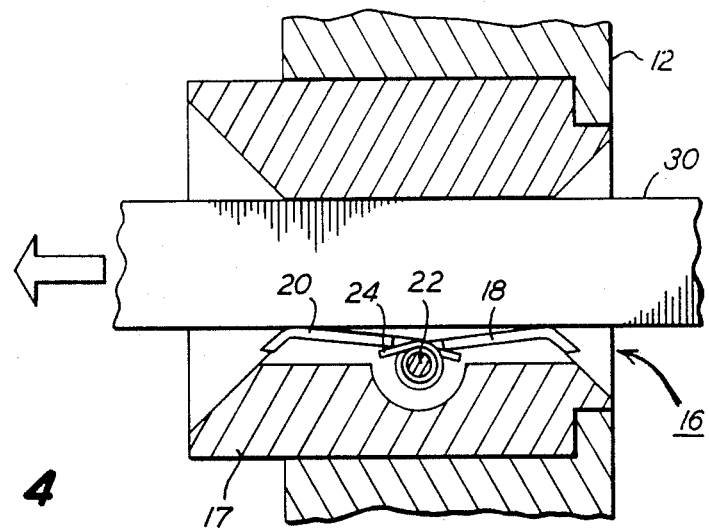
FIG. 4 is a view similar to FIG. 3 illustrating the gate assembly in the open position and a film cassette being passed therethrough.

Referring to FIG. 4 there is illustrated a cassette 30 as it enters past the gate assembly 16. It can be seen that as the cassette 30 passes over the gate assembly 16, it causes the leaves 18, 20 to separate to a substantially 180° position as illustrated.

Figure 5:
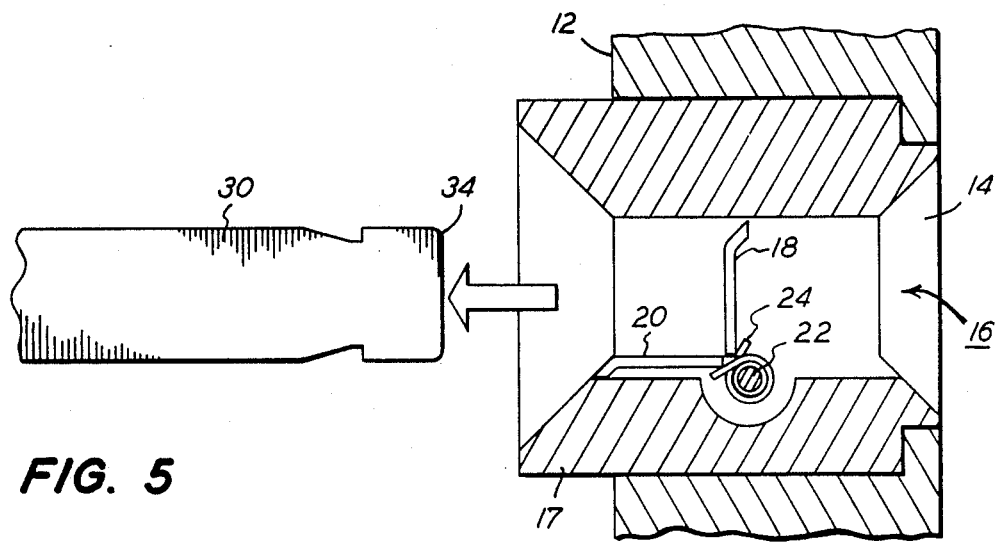
FIG. 5 is a view similar to FIG. 3 illustrating the gate in its closed position for preventing additional cassettes or foreign objects from being inserted into the housing.

Referring to FIG. 5, as the trailing edge 34 of the cassette 30 moves past gate assembly 16 the back leaf 18 rotates into the substantially vertical position to block opening 14. This occurs since the stored energy in the spring 24 causes the trailing leaf 18 to rotate counter clockwise as the cassette 30 still is pressing downward on leaf 20. As a result the leaf 18 prevents other cassettes or objects from entering the opening 14. Ejection of the cassette 30 from the filmer reverses the sequence of events causing leaf 20 to extend substantially vertically upwards as shown in FIG. 3.

Figure 6A:
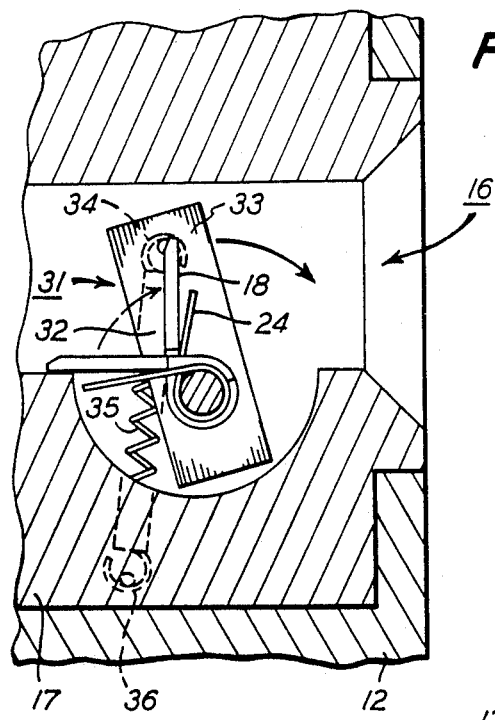
FIG. 6A is a side view of a mechanism used to maintain the gate assembly in its open position.
Figure 6B:
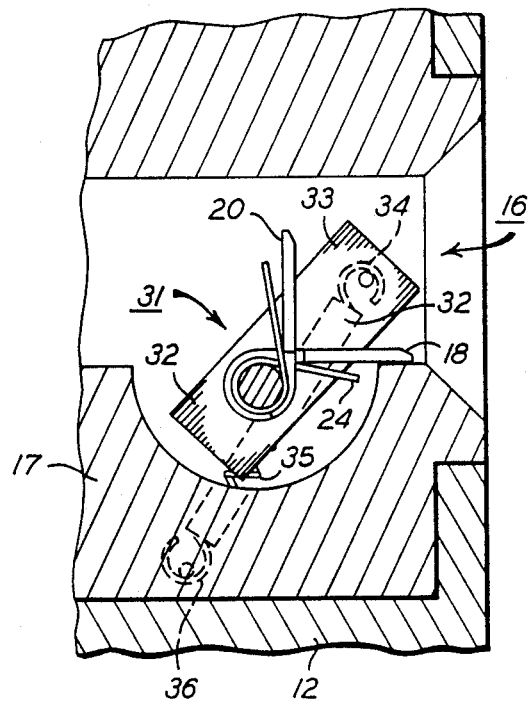
FIG. 6B is a side view of the mechanism of FIG. 6A illustrating the gate assembly in its closed position.
Figure 7:
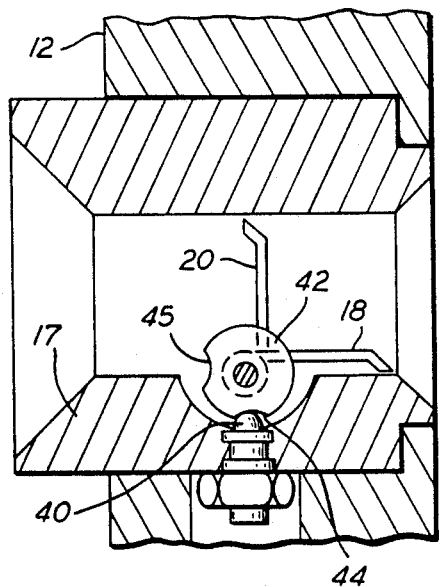
FIG. 7 is a side view of an alternate mechanism used to maintain the gate assembly in its open or closed position.

In order to insure the reliability of the operation of gate assembly 16 it is desirable to have positive means whereby the leaves 18, 20 will remain in the positions illustrated in FIGS. 3 or 5. FIGS. 6A, 6B and 7 illustrate two different methods by which this can be accomplished.

FIGS. 6A and 6B illustrate a preferred over-the-center spring assembly 31. The assembly 31 includes a connecting block or plate 32 attached to pin 22 of gate assembly 16. Pin 22 is attached to either leaf 18 or 20 of gate assembly 16. The upper end 33 of block 32 is secured to one end 34 of spring 35. The other end 36 of the spring 35 is secured to receiving block 17. When the connecting block 32 is in position shown in FIG. 6A, leaf 18 will be positioned substantially vertical. However, when block 32 is in the position illustrated in FIG. 6B (when the gate assembly is in the receiving position) the leaf 20 will be in the substantially vertical position, i.e., the open position. As the cassette 30 moves past gate assembly 31, it causes the point of attachment of spring 35 with upper connecting block 32 to be moved either to the left or right of pin 22. This causes either leaf 18 or 20 to be in the substantially vertical position.

FIG. 7 discloses a detented system. A spring loaded ball plunger 40 engages a disc 42 with two relieved areas 44, 55. Disc 42 is securely attached to pin 22, and pin 22 is attached to either leaf 18 or 20 of gate assembly 16. Plunger 40 will either nest, depending upon rotational position of the pin 22, in relieved area 44 or 45 thereby causing the gate to remain in the open or closed position.

It is important that the torsion spring 24 be strong enough to overcome the resistance of the retaining means such as the over-the-center spring system illustrated in FIG. 6 or the detented system illustrated in FIG. 7. Because the pin 22 can be attached securely to only one of the leaves 18 or 20, in one case when the cassette 30 is either entering or being ejected from the mechanism, the force of the torsion spring 24, as the cassette 30 holds both leaves 18 and 20 in the horizontal position, must be sufficient to overcome the force of the retaining means allowing the leaf 18 or 20 as the case may be, attached to the pin 22, to rotate into the vertical position as the cassette 30 completes its travel through the opening 14.

Figure 8:
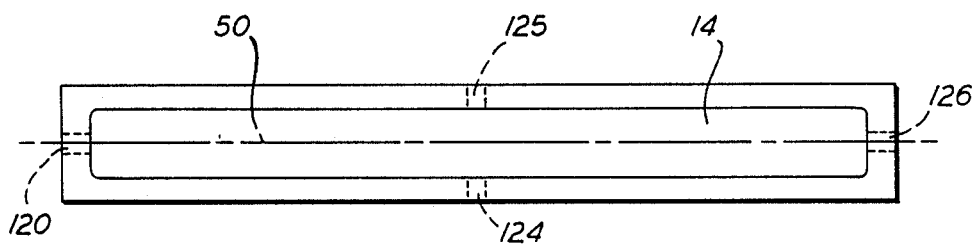
FIG. 8 is a schematic diagram of the gate assembly of FIG. 2 illustrating the placement of light sensors.

Referring to FIG. 8 there is illustrated a schematic diagram of sensing means for determining the presence of an x-ray cassette within opening 14 and/or the introduction of foreign objects within opening 14. Sensing means, for example visible light, infra red, ultra sonic, etc. are disposed across the opening 14 at various locations, for example, across the vertical or longitudinal center of opening 14. In the particular embodiment illustrated a light beam is oriented along the horizontal axis 50 by means of a light source 120 and a receiver 126. A second sender/receiver pair located at points 124, 125 respectively on axis 52 vertically cross the opening 14. The sensors at 124, 125 provide the appropriate information on the trailing edge of the cassette as it is drawn into the film handling mechanism thereby providing the appropriate information to the controller as to the length of the cassette. The sensors at 120, 126 provide information on the presence of a cassette or foreign object within opening 14.

Various changes or modifications may be made to the present invention without departing from the scope of the present invention. For example, but not by way of limitation, various other means may be used to positively position the leaves in the vertical position.

What is claimed is:

1. An apparatus for receiving an x-ray cassette having means for minimizing the entrance of a second cassette or other objects into the receiving area comprising:
a housing having an opening for receiving an x-ray film cassette, a gate positioned at said opening, said gate having first and second leaves pivotably mounted about a common pin, spring means for maintaining said gate in a first position for receiving said cassette and a second position for blocking said opening after a cassette has been properly passed through said opening into said housing and for maintaining at least one of said leaves in a substantially vertical position across said opening.

2. An apparatus according to claim 1 wherein said spring means maintains said leaves in a relative position approximately 90° apart when the gate is in the first or second position.

3. An apparatus according to claim 1 further comprising positive means for maintaining said gate in either said first or second positions.

4. An apparatus according to claim 2 wherein said means for maintaining said gate in either said first or second positions comprises a detented system.

5. An apparatus according to claim 3 wherein said means for maintaining said gate in the first or second position comprises an over-the-center spring system.

6. An apparatus according to claim 1 wherein said housing further comprises means for sensing an object being passed through said opening.

7. An apparatus according to claim 6 wherein said means comprises a light sensor placed opposite a light source disposed across said opening in either the vertical or horizontal direction.

8. An apparatus according to claim 1 wherein the ends of said leaves are angled so as to allow easy passage of said cassette through said gate.

9. An apparatus according to claim 4 wherein said detented system comprises a spring loaded ball plunger, a disc having two relieved areas disposed about the circumference of the disc, said disc being attached to said common pin, said common pin being attached to one of said leaves, said plunger capable of nesting in one of said two relieved areas for defining said first and second positions.

10. An apparatus according to claim 5 wherein said over-the-center spring system comprises a spring having one end attached to said housing, the other end of said spring being connected to a plate which is affixed to said common pin, said common pin being attached to one of said leaves, the end of the spring being attached to said plate in a position so as to cause said gate to be positively held in said first or second position.

* * * * *